United States Patent
Rice

(12) 
(10) Patent No.: US 6,310,619 B1
(45) Date of Patent: Oct. 30, 2001

(54) VIRTUAL REALITY, TISSUE-SPECIFIC BODY MODEL HAVING USER-VARIABLE TISSUE-SPECIFIC ATTRIBUTES AND A SYSTEM AND METHOD FOR IMPLEMENTING THE SAME

(76) Inventor: Robert W. Rice, 33 E. Wandering Oak Dr., The Woodlands, TX (US) 77381

( * ) Notice: Subject to any disclaimer, the term of this patent is extended or adjusted under 35 U.S.C. 154(b) by 0 days.

(21) Appl. No.: 09/189,776

(22) Filed: Nov. 10, 1998

(51) Int. Cl.[7] ................................................. G06T 15/00
(52) U.S. Cl. ............................................................. 345/420
(58) Field of Search ..................................... 345/418, 419, 345/420, 423

(56) References Cited

U.S. PATENT DOCUMENTS

| | | |
|---|---|---|
| 4,688,181 | 8/1987 | Cottrell et al. . |
| 4,718,024 | 1/1988 | Guttag et al. . |
| 5,239,624 | 8/1993 | Cook et al. . |
| 5,239,625 | 8/1993 | Kunii et al. . |
| 5,307,452 | 4/1994 | Hahn et al. . |
| 5,381,518 | 1/1995 | Drebin et al. . |
| 5,490,239 | 2/1996 | Myers . |
| 5,521,815 | 5/1996 | Rose, Jr. . |
| 5,568,811 | * 10/1996 | Olstad .............................. 128/660.07 |
| 5,762,612 | 6/1998 | Campbell . |
| 6,064,390 | * 5/2000 | Sagar et al. .......................... 345/420 |
| 6,078,308 | * 6/2000 | Rosenberg et al. .................. 345/145 |
| 6,078,681 | * 6/2000 | Silver ................................... 382/133 |
| 6,097,396 | * 8/2000 | Rouet et al. ......................... 345/430 |

\* cited by examiner

*Primary Examiner*—Cliff N. Vo
(74) *Attorney, Agent, or Firm*—Lorusso & Loud

(57) ABSTRACT

A three-dimensional, virtual reality, tissue specific model of a human or animal body which provides a high level of user-interactivity. The model functions can be analyzed and user-modified on a tissue-by-tissue basis, thereby allowing modeling of a wide variety of normal and abnormal tissue attributes and corresponding study thereof. The model can be user-modified through a keyboard, or other VR tools such as a haptic interface. The haptic interface can modify the model to correspond to the tissue attributes of a user, and can provide sensory output corresponding to the interaction of the model to a prescripted scene.

8 Claims, 4 Drawing Sheets

VIRTUAL REALITY, TISSUE-SPECIFIC BODY MODEL HAVING USER-VARIABLE TISSUE-SPECIFIC ATTRIBUTES AND A SYSTEM AND METHOD FOR IMPLEMENTING THE SAME

FIELD OF THE INVENTION

The present invention generally relates to a model of a human or animal body, and, more particularly, to a computer-implemented virtual reality, tissue-specific body model having user-variable tissue-specific attributes.

BACKGROUND OF THE INVENTION

The somatic portion of a body, either human or animal, is distinct from the visceral internal organs, and represents the structural elements of the body form. The skeletal system, made of bone and cartilage is moved by the somatic muscular system attached to the bones directly or by way of tendons. The muscles which are voluntarily contracted to create purposeful movement are regulated by the nervous system. This anatomical triad, the neuromusculoskelatal system is responsible for the body's stature and physique, posture and movement, and its ability to perform activities and work.

Functional attributes of the somatic system are, therefore, of great interest to persons in a wide variety of fields. For example, medical students study the somatic system to learn normal human anatomy, professional athletes study the somatic system in an effort to maximize their efficiency of movement, people in the manufacturing industry study how the human anatomy interacts with manufactured products, etc. In this regard, however, it is often difficult to accurately determine how a particular body will function or interact to stimuli since study has historically been performed by observation of living persons or cadavers.

To facilitate the study and analysis of the human body, therefore, systems and methods for modeling and analyzing body motions using a computer have recently been developed. Typically, the modeling involves creating a three-dimensional (hereinafter "3D") representation of the body, and animating the model on a computer display using known physical constraints for the segments forming the body. The model can, therefore, be animated to "move" according to standard prescripted programs and the known physical constraints.

An example of such a computer implemented model is provided in the disclosure of U.S. Pat. No. 5,625,577 to Kunii et al (hereinafter "the '577 patent"), the teachings of which are incorporated herein by reference. The model disclosed in the '577 patent is divided into a plurality of segments connected by joints. Each of the segments operates as a separate unit of motion. Data for modeling the body on the basis of physical constraints and the inherent physical nature of each segment is maintained in a computer-readable database. Actual movements of a moving body, including the movement of each segment, are then observed and analyzed to calculate new data based on the actual movements. A new movement for the body can then be modeled using the data from actual movements and physical constraints for each segment, which are invariable parameters set in the database for the model.

Unfortunately, however, models and systems for modeling such as that described in the '577 patent, have failed to provide a useful level of detail in regard to the anatomical structure of the modeled body. In fact, most models incorporate only broadly defined anatomical segments in order to reduce computational complexity and computer rendering time. Models including high levels of anatomical detail are generally limited to only specific body segments, e.g., a single hand or foot. There has been no model, to date, which provides a highly-detailed tissue-specific animation of an entire human body. Naturally, the level of model detail provided by a tissue-specific total body model which "moves" in a realistic manner would be highly useful in studying the human anatomy.

Another deficiency of known models, is a failure to provide versatility in terms of the modeled anatomy and its associated functions. In fact, most models are based on specific data representations of broadly defined anatomical segments which cannot be user-modified. Thus, the models represent only a particular body, with a particular shape and physical constraints. The body can, therefore, function in its animation only in a pre-defined, invariable manner. A user cannot modify the displayed model to show a body having detailed segments of varying size, weight, strength, etc. This feature would, however, be highly desirable since it would facilitate analysis of different body and segment shapes, and of functional abnormalities which could be analyzed for investigation of possible corrective approaches.

Moreover, known computer-implemented models are presented in either a static form or with only pre-scripted motion in a static environment. The user cannot manipulate the model to cause animated movement of choice, and cannot change the physical constraints of the environment in which the model is displayed and/or animated in a manner which effects the performance of tissues defined by variable attributes. For example, in a typical model, such as that disclosed in the '577 patent, the body is animated in a particular size and shape, and to account for standard Newtonian physical parameters wherein the effects of the force and direction of gravity on the broadly-defined anatomical segments are modeled based on invariable segment shapes and dimensions. A user cannot, therefore, modify the environment and the body within the environment to account for different gravitational effects, such as would exist for example in space or in moving objects.

There is, therefore, a need in the art for a computer implemented, tissue-specific, three-dimensional, virtual reality model of a human or animal body, which includes user-variable, tissue-specific parameters relating to anatomical, physiological, dimensional, environmental, and Newtonian physical attributes, and which may be animated on a computer screen in an computer implemented environment having user-variable Newtonian physical characteristics.

OBJECTS OF THE INVENTION

A primary object of the present invention is to provide a computer-implemented, tissue-specific model of the somatic structure of a human body which may be animated by the computer on a display in three-dimensional virtual reality.

Another object of the present invention is to provide a computer-implemented, tissue-specific model of the somatic structure of a human body which may be animated by the computer on a display, and which includes user-variable, tissue-specific parameters or attributes allowing for variation of the anatomical, physiological, dimensional, environmental, and physical aspects of the model on a tissue-by-tissue basis.

Still another object of the present invention is to provide a computer-implemented, tissue-specific model of the somatic structure of a human body which may be animated by the computer on a display, and which includes user-variable, tissue-specific parameters or attributes allowing for variation of the anatomical, physiological, dimensional, and physical aspects of the model on a tissue-by-tissue basis by use of a haptic interface, thereby allowing adjustment of the parameters or attributes so that the model approximates the attributes of the model to approximate the tissue-specific parameters or attributes of a user.

Yet another of the present invention is to provide a computer-implemented, tissue-specific model of the somatic structure of a human body which may be animated by the computer on a display which includes a computer-implemented environment, wherein the Newtonian physics and environmental aspects of the environment, e.g., the force and direction of gravity, atmospheric pressure etc., may be user-modified.

A further object of the present invention is to provide a computer-implemented, tissue-specific model of the somatic structure of a human body which may be animated by the computer on a display, and which includes user-variable, tissue-specific parameters or attributes allowing for variation of the anatomical, physiological, dimensional, and physical aspects of the model on a tissue-by-tissue basis, and which provides inverse dynamics calculations as output to a user for analysis of the dynamics associated with the animated movement.

Still a further object of the present invention is to provide a computer-implemented, tissue-specific model of the somatic structure of a human body which allows for user-variation of tissue specific attributes for simulating abnormalities in the body, thereby allowing animation of the body with abnormal tissue attributes by the computer on display.

Another object of the present invention is to provide a computer-implemented, tissue-specific model of a body which provides for an improved level of detail compared to known computer-implemented body models.

Still another object of the present invention is to provide a computer-implemented, tissue-specific model of a body which increases the efficiency and accuracy of anatomical study.

Yet another object of the present invention is to provide a computer-implemented, tissue-specific model of a body which allows for study of anatomical functions in an environment having user-variable physical and environmental properties.

These and other objects of the present invention will become apparent from a review of the description provided below.

SUMMARY OF THE INVENTION

The present invention is organized about the concept of providing a computer implemented model of an entire human or animal body which includes a high level of tissue-specific detail. The model is animated by the computer on a display in three-dimensional virtual reality. Virtual reality provides a way for humans to visualize, manipulate and interact with computers and extremely complex data. The virtual reality model according to the invention performs realistic movements and has realistic reaction to simulated events. Advantageously, the model is not static, but responds to user input variation of model attributes/parameters to provide a high level of real-time user-interactivity. The user can modify specific model attributes on a tissue-by-tissue basis to observe various outcomes using inverse kinematics. User input can be provided by a variety of means to modify the virtual model instantaneously.

Specifically, the present invention provides a three-dimensional, virtual reality, tissue-specific model of a human body including a plurality of individual tissue representations combined to form the body. The tissue representations are defined by user-variable tissue-specific attribute data which controls animation of the model on a computer screen. A system for displaying the model includes a computer readable memory device containing data and instructions for modeling the body by combination of a plurality of individual tissues which form the body. The data includes user-variable tissue-specific attribute data relating to the inherent nature of the tissues. The computer includes a central processing unit for displaying the model on a computer screen from the data and the instructions. A user input device such as a keyboard, graphical user interface, haptic interface, or other VR tool, allows for modifying the tissue specific attribute data, thereby allowing modification of the model based on user-defined tissue attributes. The tissue attributes modeled may vary according to the desired features and function of the model.

Also according to the invention there is provided a computer executable software program stored on a computer readable medium and a computer readable medium containing the code. The code animates a three-dimensional, virtual reality, tissue-specific model of a human body on a computer screen. The code includes code for defining user-variable attribute data for a plurality of the tissues of the model. The data controls the animation of the model on the computer screen.

BRIEF DESCRIPTION OF THE DRAWING

For a better understanding of the present invention, together with other objects, features and advantages, reference should be made to the following description of the invention which should be read in conjunction with the following figures wherein like numerals represent like parts.

DETAILED DESCRIPTION OF THE INVENTION

The present invention will now be described in connection with one embodiment thereof which is a model of a human body. Advantageously, the three-dimensional, virtual reality, tissue-specific human body model according to the invention is particularly useful in connection with detailed study of human anatomy and physiology. It is to be understood, however, that the features and advantages of the invention could be incorporated into models for any living creature which is of interest from an anatomical standpoint.

Figure 1:
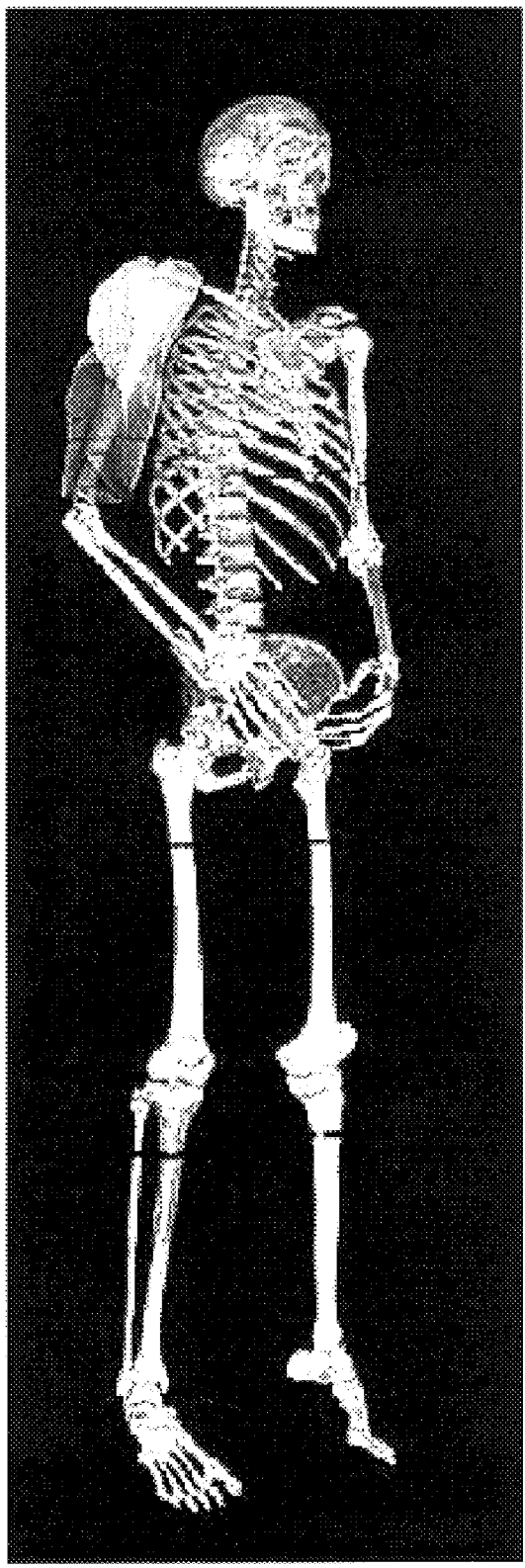
FIG. 1: is a screen image from a computer display showing a portion of a model according to the invention.

Referring now to FIG. 1 of the drawing, there is shown an isometric view of a model 10 according to the invention which has been taken from a computer display. As shown, the model 10 includes representations of the individual anatomical tissues, i.e., the model is tissue-specific.

Although a model according to the invention could incorporate any number of anatomical tissues, including all of the tissues which form the body being models, the tissues of the somatic structure which are useful to model are: compact and calcious bone; skeletal and smooth muscle; hyaline, fibrous, elastic and articular cartilage; dense regular and irregular connective tissue (tendons, ligaments and facia); and central and peripheral nervous tissue. Each of these tissues in presented in an anatomically correct orientation to related tissues. For example, the model 10 shows the biceps brachii with its proper anatomical connection to the humorous, ulna and radius.

An underlying data set for generating the anatomically correct, tissue-specific model of the present invention was obtained from the Visible Human Project, developed by the National Library of Medicine. This project developed complete, anatomically-detailed, three-dimensional representations of a male and female human body from CT, MRI and cryosection images of representative male and female cadavers. With the availability of the cross-sectional images from the Visible Human Project, it became possible to develop a comprehensive database of virtual reality 3D anatomical models and images of the human body with high levels of accuracy, flexibility, and realism. Such models and images are available from a number of sources, such as Visible Productions, L.L.C. The virtual models from Visible Productions, L.L.C. are in an OpenInventor™ file format, and are useful base models from which a model according to the invention may be derived.

Those skilled in the art will recognize that, with the current state-of-the art, a high level of computing capacity would be required to manipulate the base models into a 3D, virtual reality, body model according to the invention. It is to be recognized, however, that as virtual reality data capture and presentation methods improve, less computing capacity will be necessary to render high-quality virtual reality images. Nonetheless, a Silicon Graphics Indigo 2 desktop workstation was found to be useful in creating a model according to the invention using over 200 base model files from Visible Productions, L.L.C. Advantageously, the resulting model is a three-dimensional virtual reality model in Virtual Reality Modeling Language (VRML) file format. The model employs computer graphics to create a realistic looking and behaving representation of the human body which can be viewed in 3D from any perspective.

In creating a model according to the invention, those skilled in the art will recognize that several commercially available software tools could be used. However, the following software tools proved to be particularly useful:

PolyRed: A tool for optimizing 3D models for real-time visualization by reducing the number of polygons in the model while preserving all model features; and Ez3D VRML Author by Radiance Software International: A complete VRML (Virtual Reality Modeling Language) authoring product which was used as the main model developing tool; and VrTool by Lincom Corporation: An event-driven, distributed processing tool-kit for virtual reality application development consisting of software components providing; a central controller (VrController), rendering of the virtual scene (VrRenderer), Input/output device management (VrDevice), collision detection (VrCollision), a user interface for constructing the virtual environment hierarchy (VrGui), sound processing (VrSound), and an application programmers interface (API) for developing an application that can participate within the VR run-time environment.

Creation of a model according to the invention generally included two main steps; (1) assembly of the model files from Visible Productions, L.L.C. into correct anatomical positions to create the model in its 3D form; (2) and rendering the model in virtual reality to simulate human movement. Assembly of the model files was accomplished in the three main steps of reduction, optimization, and integration.

The reduction step involved minimization of the number of polygon representations of the base models. Three-dimensional visualization models are usually displayed based on a polygonal description of their surfaces, often requiring hundreds of thousands of polygons. For interactive applications a larger number of polygons is a major obstacle given current computing capabilities. Using state-of-the art computer graphics hardware, approximately, 100,000 polygons can be visualized interactively, but medical data from CT or MRI sources can produce 500K to 2,000K polygons.

Accordingly, to reduce the number of polygons in the model, the polygon reduction program Polyred was used since it preserves all model features, such as textures, materials, colors, object/scene hierarchy and volume. In was found that in order to provide a model which allowed for real-time interaction in the virtual reality rendering software used in implementing the invention, i.e., VrTool, most of the models were reduced to 90% of their original size.

After the models were reduced appropriately, they were optimized to improve upon their appearance. One method used for optimization was to increase the crease angle of the reduced model file using Ez3d. When reducing triangles of an object, it was found that a point was reached where no other object faces could be reduced since the system set to preserve creases. To obtain further reduction, the crease angle was increased, thus making the object appear smoother, and then the model was further reduced.

In addition to increasing the crease angle and further reducing the model files, the model files were further optimized using Vrtool.ivopt. This step enhances the performance of VrTool in the rendering process by taking advantage of a new extension to OpenInventor which allows specification of vertex data, such as coordinates, normals, texture coordinates and color in a compact fashion. Texture mapping was also added to the muscle model files by scanning pictures of real muscles. Texture mapping makes the muscles look more realistic and separates them visually from the bone models.

Once the individual model files are reduced and optimized they were integrated. Since the original data set included over 200 model files, the skeletal files were combined into groups to facilitate the integration process. The bones in each group were those that always keep a fixed relative position and direction with other bones in the same group during a movement. The bones in different groups could have a different relative position and direction during movement. For example, the upper body of the skeleton consists of many small bones. These bones were treated as a group since their relative position and direction do not change during a body movement. Model files were then grouped into submodels using Ez3d, each representing a part of the final model.

To complete a virtual reality model according to the invention, VrGui was used to build the simulator scene file for the body model from the submodels to simulate human movement using Vrtool. The scene file built with VrGui correlates the submodels and other objects in a hierarchical manner, and provides the basic definition of the virtual world. The basic building blocks of the scene file are called nodes. Each node contains information about a model object. The object models/submodels were constructed in the scene file according to their virtual environment hierarchy. This hierarchy defines a group of objects which move together as a whole, but whose parts also move independently.

Figure 2:
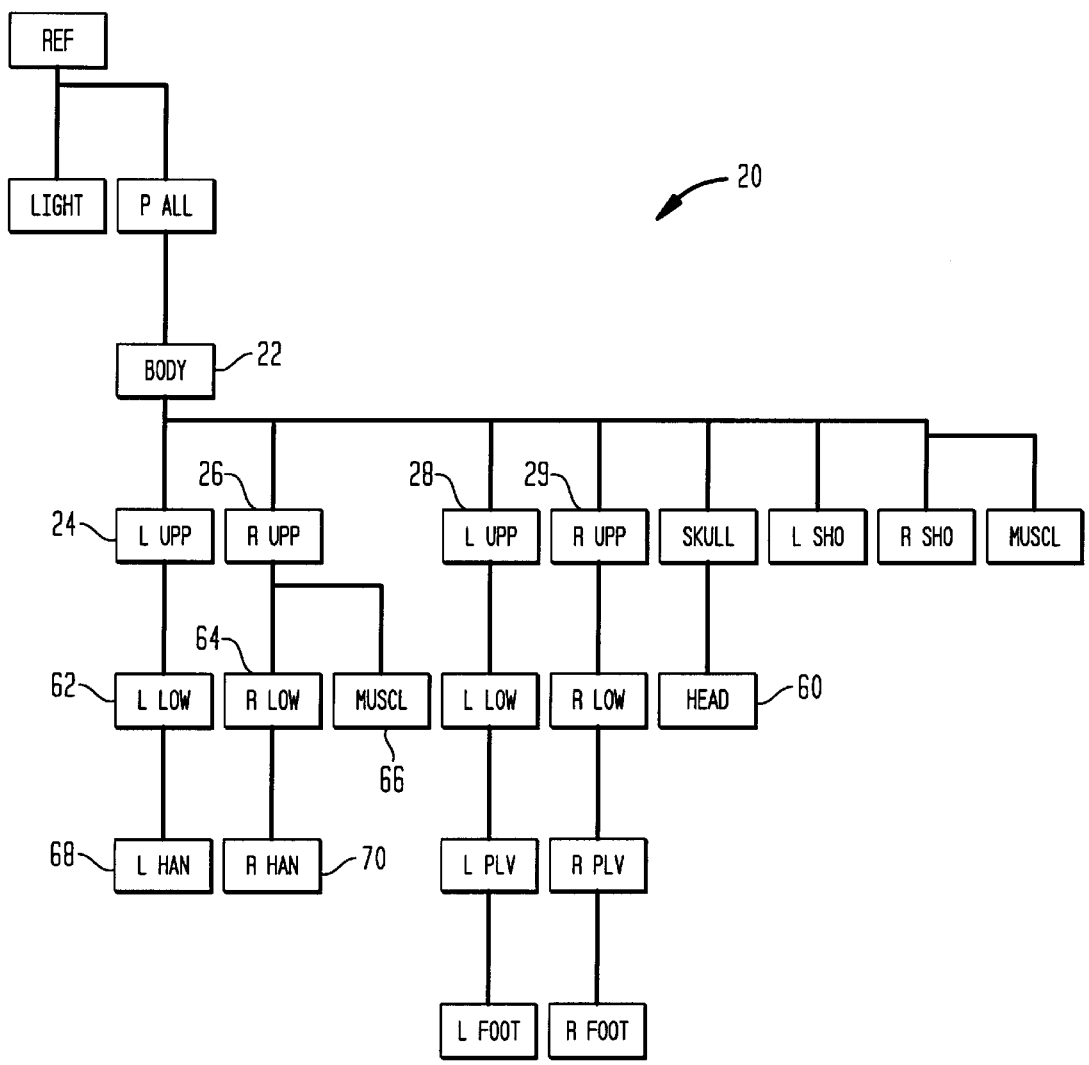
FIG. 2: is a screen image of a scene file in Vrtool showing a portion of the nodes for a model according to the invention.

Hierarchies are divided into at least two levels. The higher level object is sometimes called the "parent" object, while the lower level blocks are the "child" objects, which are usually replicated several times in the complete structure. FIG. 2 represents a simple human body node 22 in a scene file 20. The node has two upper arms 24, 26, two upper legs 28, 29, and a head 60. The upper arms have two lower arms 62, 64 with muscle 66 attached to the right arm. Each arm ends with a hand 68, 70 which can move independently. The hand follows the motion of the arm, which follows that of the upper body.

The various object dependencies are made explicit in the tree-graph in the scene file. Here nodes represent objects, while edges represent relationships. The relative positions in the tree indicate inclusions. The body node is above the arm and leg nodes. Therefore, the arm and leg objects are included in the body.

Once the scene file is created, a simulation application program is created which controls the activity of the simulator to simulate the operation of the body. An exemplary simulation application program listing written in C programming language for simulating a portion of a model according to the invention including the entire skeletal system is attached hereto as appendix A. Three kinds of functions are used in the application program: (1) initialization functions, (2) functions that retrieve data from the VrController, and (3)functions that send data to the VrController.

During the simulation startup, the following initialization functions are called in an application using VrTool:

"vrInitApplication (char**argv)" establishes connection with the VrController where "argv" is the host name where the VrController resides;

"vrGetId (char *nodename)" causes each node in the scene file to be assigned an object identification (hereinafter "id"), where "nodename" is the object (node) name that resides in the scene file. These ids are then used by the program during the simulation to manipulate the objects;

"vrAddCallback (int id)" informs the VrController that an event for a node id is to be sent to the application when that node state changes for that event. It also will be called when the Controller returns the requested event;

"vrAddDeviceCallback (mint device)" informs the Vrcontroller to transmit device data from a specific host and cpu where the device is connected;

"vrSendRequest( )" sends the initial request to the VrController; and

"vrInitProcess (int microsec, void sim)" sets the system interval timer to a timer resolution in microseconds to call the user function sim.

VrController sends state data to the application as requested during initialization. These following functions are used to extract necessary data from VrController:

"vrGetState( )" is called to determine if VrController is ready to accept data and has sent a new system state. It is placed at the beginning of the main function which is called by the system timer;

"vrGetPos(int id, float *x, float *y, float *z)" returns the x, y, z position of the node id relative to the parent node in inches;

"vrGetDevice( )" returns sensor data for a device in the form of the data array containing the device data; the device is obtained using the function "vrAddDeviceCallback"; and "vrGetHit (int id)" is applied to get the id of a passive object which is hit by an active object. The function will return the passive object's id.

Advantageously, the simulation program can control data and other attributes associated with node objects. These data are sent to the VrController which processes them and routes data to other processes. The following functions are used for controlling the attributes associated with the node objects:

"vrSetPos(int id, float *x, float *y, float *z)" sets the x, y, z position of the node id relative to the parent node in inches;

"vrSetMatrix (int id, MATRIX matrix)" specifies the 4×4 matrix for node id where type is either global for the matrix in world coordinate system or local for the matrix in local coordinates; and "vrSetCollision ( )" sets the collision type and method with types active, passive, or both for the node id.

Figure 4:
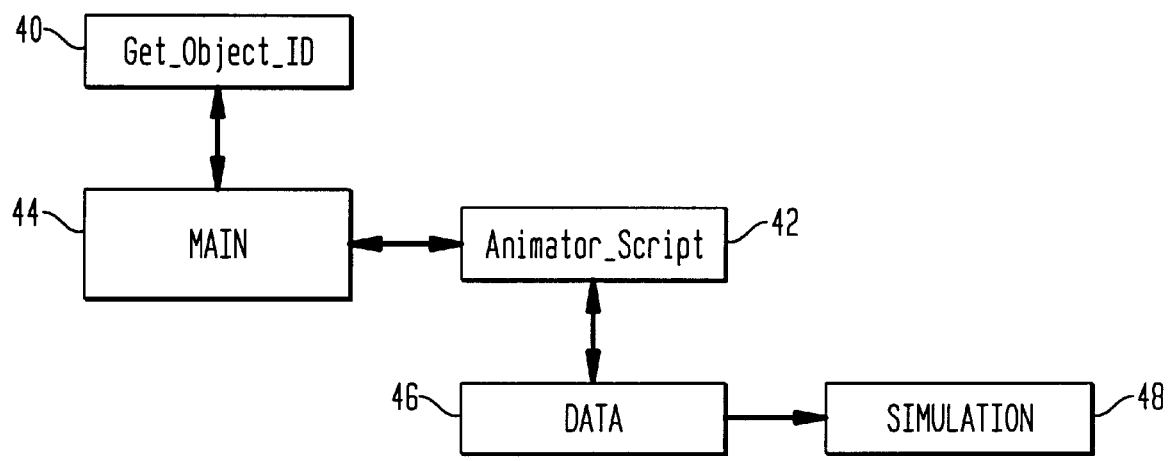
FIG. 4: is a flow diagram showing the general structure of a simulation program for a model according to the invention.

The structure of the simulation program is shown in block diagram form in FIG. 4. The function "Get-Object-ID" 40 causes each node in the scene file to be assigned an object id by using the VrTool API function (Char *nodename), where nodename is the object (node) name that resides in the scene file. These ids are then used by program during the simulation to manipulate the objects. Representative software listing for the "Get-Object-ID" function is as follows:

```
void Get-Object-IDO
{
  int i;
  for(i=O;i< NUM_OBJ;i+-+) }
    object_-id[i].id = vrGetId(object_names[i]);
}
```

In the program listing provided in the Appendix, there are a total eight data files, the names of these files are copied in a DATA file 46 such as:
8
HUMAN_BODY
L_OWARM
R_LOWARM
R_UPARM
L_HAND
L_UPPER
HEAD The position of each node is copied in its own data file, for example the position of the right lower arm (R_LOWARM) may be provided as:
r_lowarm
6
1 157.479996 74.803001 905.510010 1
2 0.0000 0.0000 0.0000 1
1 157.479996 74.803001 905.510010 1
2 0.0000 0.0000 0.0000 1
1 157.479996 74.803001 905.510010 3500
2 -43.000000 30.000000 0.000000 250

The first line in the file line is the name of the node. The next line including "6" is the number of the data lines in the file. At the beginning of each subsequent line, "1" refers to translation; "2" refers to rotation. For translation, the next three numbers set the X/Y/Z axis position of the node relative to the parent node in inches. For rotation, the next three numbers set the angle of the node around X/Y/Z axises relative to the parent node in degrees. The last number is the time interval between the two movement positions in seconds. These data are set up in the following code:

```
case 1: /* Translation */
        vrSetXpos (id,*curX);
        vrSetYpos (id,*curY);
        vrSetZpos (id, *curZ);
        break;
case 2: /* Rotation*/
        vrSctXrot (id,*curX);
        vrSetYrot (id,*curY);
        vrSetZrot (id,*curZ);
        break;
```

The Animator-Script function 42 reads in these data and sends the data to VrController. The simulator begins the simulation 48 until the movement is finished. This is implemented by using a loop such as:

```
For(i=O; i<num__file; i++) {
    if(((done[i]==TRUE) && readin[i] < datanum[i])) {
        fscanf(infile [i], "%d",&(targetType[i]));
        line__num[i] = line__num[i] + 1;
    if(targetType[i] == 1){
        stepsizeX[i]=(targetX[i] - currentX[i])/steps[i];
        stepsizeY[i]=(targetY[i] - currentY[i])/steps[i];
        stepsizeZ[i]=(targetZ[i] - currentZ[i])/steps[i];
        } else if(targetType(i] == 2){
        stepsizeRX[i]=(targetX[i] - currentRX[i])/steps[i];
        stepsizeRY[i]=(targetY[i] - currentRY[i])/steps[i];
        stepsizeRZ[i]=(targetZ[i] - currentRZ[i])/steps[i];
        }
}
```

In the "main" function 44, the VrTool API function "vrInitApplication(argv)" is called to connect the VrController. "vrInitProcess (int microsec,sim)" sets the system interval timer to a timer resolution in microseconds to call the function sin to get from and send data to the VrController. The following exemplary code accomplishes the "main" function:
void main (int argc, char **argv):
{
vr Init Application(argv):
init__script( );
Get__Object__ID( );
vrRequestEvents(object__id[Ncave].id,MATRIXEVENT);
vrSendRequest( );
vrLoadmatrix(Identity);
vrGetmatrix(matrix);
Update__Matrix(0,0,0,0,0,0.0,matrix);
pf=sim;
vrInitProcess(10000,pf);
}

Figure 5:
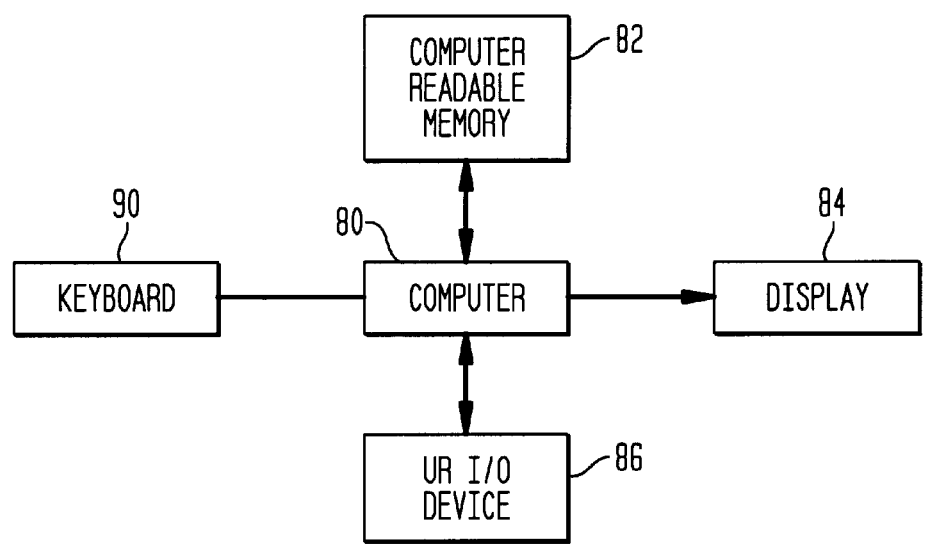
FIG. 5: is a diagram of a computer system for implementing a model according to the invention.

With reference to FIG. 5, the VrTool application must be stored on a computer readable memory 82 for access by the computer 80 for the simulator to run. The memory may be in the form of any computer readably memory known to those skilled in the art including, but not limited to: a hard disk, a CD Rom floppy disk, etc. All of the model files should be copied to the "Models" directory of the memory. The scene file should be copied to the "scene" directory of the memory. The simulation program and make file should be copied to the "Data" directory of the memory.

Advantageously, through input/output (I/O) tools 86, user input represents a series of events for the toolkit program. User input is read as set of data in real-time at each simulation cycle in order to minimize latency. These data are then used to update virtual body position and shape.

Figure 3:
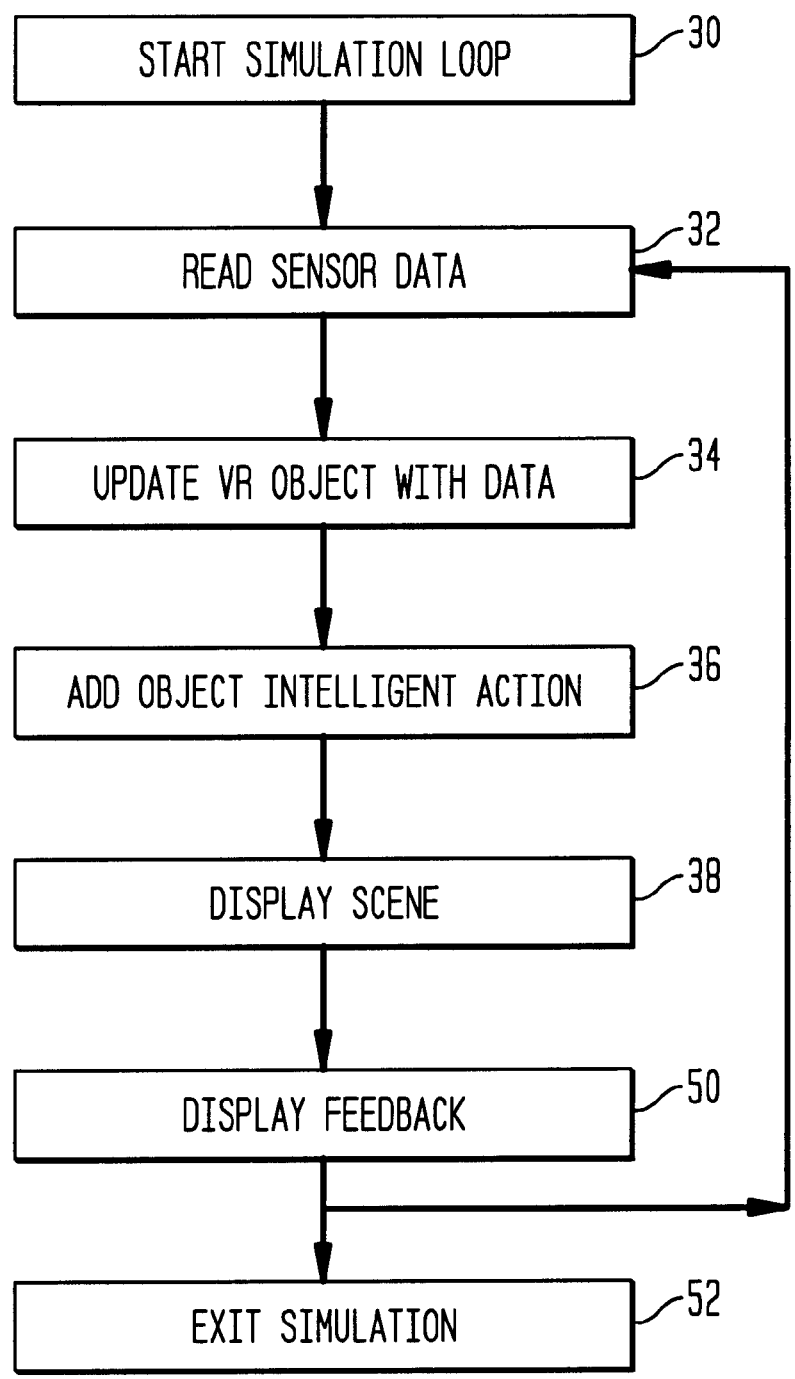
FIG. 3: is a flow chart showing the general flow of a simulation program for a model according to the invention.

Additional inputs from external sensors can be used to change body "intelligent" behavior. The resulting scene is displayed graphically on the computer display 84. Similarly, tactile and force feedback are also displayed. The resulting simulation loop is illustrated in FIG. 3. As shown, the simulation loop is started 30 as described above, and sensor data is read from the user I/O sensors 32. On the basis of the sensor data, the model is updated 34, and object intelligent action is added from the sensors 36, the model scene is then displayed 38, followed by display of the feedback 50 from the model action. The simulation proceeds in a loop until a scripted motion is complete, or until a user exits the simulation 52 manually.

Advantageously, the nodes of the scene files are made of individual tissues or groups of related tissues. Accordingly, tissue-specific attributes which control the reactions of the nodes in the model scene are provided as user-variable data in the application program. In the one embodiment, data for the following tissue attributes are provided to control the function of each tissue within the scene:

Skeletal tissue attributes: Mineral density; Rheologic modeling values—elasticity (Young' modulus), viscosity, plasticity, tensile and compressive load strength (capacity and rate);

Neural tissue attributes: Signal propagation speed factors—axon type, axon diameter, myelination; signal amplitude and latency; and Muscular tissue attributes: line of action; peak isometric muscle force; muscle-fiber length; tendon slack length; tendon force; maximum shortening velocity; moment arm; motor unit recruitment; tonus level; peak isotonic and isometric tension; and gravity.

Thus, the term "tissue-specific attribute" as used herein refers to any characteristic of a particular anatomical tissue which defines its operation, structure, or its relationship to other elements in an environment. The data for tissue-specific attributes are documented in the domain of the texts, atlases, monographs, and research literature of the applicable scientific disciplines: Gross anatomy, histology, neuroanatomy, physiology, kinesiology, biomechanics, biophysics and physical medicine. Tissue attributes can also be obtained from the particular knowledge of the programer to define a model which functions within the limits of the attributes.

It is to be understood that a wide variety of tissue-specific attributes may be incorporated into a simulation to account for desired function. In particular, attributes such as the effect of gravity on the entire model, the effect of heat on specific tissues, the effect of varying atmospheric pressure, failure rate attributes relating to the number of times a particular tissue can be contacted at a particular force before failure, etc., can be provided in the model to simulate any desired condition. The tissue attributes described herein are, therefore, provided for illustration, but not of limitation.

Exemplary code to establish exemplary tissue-specific attributes of the Biceps brachii muscle is as follows:

```
beginmuscle BicepsBrachii
beginpoints
    0.013   -0.038  -0.029  segment SCAPULA
    0.029   -0.239   0.031  segment HUMERUS
    0.031   -0.267   0.008  segment HUMERUS  range
   -0.002   -0.030   0.003  segment RADIUS
```

-continued

```
endpoints
begingroups   shoulder_flexors        elbow_flexors supinators
force_max                             320.0      /*Newtons*/
optimal_fiber_length   0.12                      /*meters*/
tendon_slack_length 0.17                         /*meters*/
pennation_angle                       0.0        /*degrees*/
max_fiber_velocity                    7.0        /*fiber
lengths/ sec*/
endmuscle
```

Running this program segment will activate the Biceps brachii muscle in the scene so that it will contribute to the range of motion of the upper extremity within normal limits by acting as a shoulder flexor, an elbow flexor and a forearm supinator across the shoulder and elbow joints. Specific tissue-level attributes, such as "maximum (muscle) fiber velocity", validate the simulation's realism.

Importantly, the model is implemented so that each of the tissue attributes is a variable. The range within which the variables can be defined can be set to "normal" human limits, to the demonstrated limits of a given individual, or to the limits that encompass what is considered abnormal, excessive or diseased.

In addition, the variables can be modified within the particular simulation program, through a graphical user interface (GUI), a keyboard 90, or through other VR I/O devices 86. A number of specialized types of VR I/O devices 86 have been developed to measure user input and provide output to the simulation program based on the user input. These devices vary in complexity, and include, for example, a simple mouse, a trackball, dextrous sensing gloves, Cyberscopes, head-mounted displays, LCD glasses, 3D sound generators, etc.

One VR I/O device 86 which can be effectively used to vary user input is a haptic interface device developed by SensAble Technologies, Inc. The haptic device includes sensors which allow modification of the tissue-specific simulation data base on the user to which the haptic device is attached. Thus, with use of the haptic interface, the model may be modified to conform to the attributes of a user to model the reaction of a particular user to a modeled event. The use of the haptic interface in this way to vary the displayed model, creates a level of user-interactivity which presents a wide variety of potential uses. For example, the model can simulate user motion in space and the effect of weightless environment on a particular user.

The haptic interface can also receive output from the simulation program which allows a user to "move" the virtual body through a prescripted scene. As the virtual body contacts an item in the scene, the haptic interface outputs sensations such as forces, temperature, texture, etc., to the portion of the user's anatomy which corresponds to the point of contact for the model.

There is thus provided a three-dimensional, virtual reality, tissue specific model of a human or animal body which provides a high level of user-interactivity. The model functions can be analyzed and user-modified on a tissue-by-tissue basis, thereby allowing modeling of a wide variety of normal and abnormal tissue attributes and corresponding study thereof. The model can be user-modified through a keyboard, or other VR tools such as a haptic interface. The haptic interface can modify the model to correspond to the tissue attributes of a user, and can provide sensory output corresponding to the interaction of the model to a pre-scripted scene The embodiments described herein, are but some of several which utilize this invention, and are set forth here by way of illustration but not of limitation. For example, the model need not be limited to the somatic structure and could be extended to include visceral organs and all other tissues of the human or animal anatomy. It is obvious that many other embodiments, which will be readily apparent to those skilled in the art, may be made without departing materially from the spirit and scope of this invention.

What is claimed is:

1. A computer-implemented system for displaying a three-dimensional, virtual reality, tissue-specific model of a human body comprising:
   a computer readable memory device containing data and instructions for modeling said body by combination of a plurality of individual tissues which form said body, said data including user-variable tissue specific attribute data;
   a central processing unit for displaying said model on a computer screen from said data and said instructions; and
   a user input device for modifying said tissue specific attribute data, thereby allowing modification of said model based on user-defined tissue attributes.

2. A system according to claim 1, wherein said tissue attribute data includes data relating to Newtonian and biological parameters of said tissues.

3. A system according to claim 2, wherein said user input device is a keyboard.

4. A system according to claim 2, wherein said user input device is a haptic interface.

5. A system according to claim 4, wherein said tissue attributes are modified based on tissue attributes of the user of said haptic interface.

6. A computer executable software program stored on a combination of a computer readable medium for animating a three-dimensional, virtual reality, tissue-specific model of a human body on a computer screen, the code comprising: code for defining user-variable attribute data for a plurality of said tissues of said model, wherein said data controls the animation of said model on said computer screen.

7. A computer readable medium having computer executable software code stored thereon, the code for animating a three-dimensional virtual reality tissue-specific model of a human body, the code comprising: code for defining user-variable attribute data for a plurality combination of a of said tissues of said model, wherein said data controls the animation of said model on said computer screen.

8. A three-dimensional, virtual reality model of a body, said model comprising: a plurality of individual tissue representations combined to form said body, said representations being defined by user-variable, tissue-specific attribute data which controls animation of said model on a computer display.

* * * * *